No. 813,485. PATENTED FEB. 27, 1906.
B. D. COPPAGE.
SLIDE RULE.
APPLICATION FILED MAR. 31, 1904.

WITNESSES:
H. B. Bradford
Reginald Constable

INVENTOR.
Benjamin Drewer Coppage

UNITED STATES PATENT OFFICE.

BENJAMIN DENVER COPPAGE, OF WILMINGTON, DELAWARE.

SLIDE-RULE.

No. 813,485.  Specification of Letters Patent.  Patented Feb. 27, 1906.

Application filed March 31, 1904. Serial No. 200,957.

*To all whom it may concern:*

Be it known that I, BENJAMIN DENVER COPPAGE, a citizen of the United States, residing at Wilmington, in the county of Newcastle and State of Delaware, have invented certain Improvements in Logarithmic or Computing Slide-Rules, of which the following is a specification.

One object of my invention is to so construct a slide-rule that it will be practically free from the effects of atmospheric changes, both of temperature and humidity, which are so objectionable in many forms of slide-rules.

Another object is to so construct a slide-rule that its scales are protected from injury by soiled hands during operation, a further object being to so construct a slide-rule that its simplicity would make possible its universal use by salesmen, clerks, artisans, and school children, for whom the more complicated devices of the kind are impracticable, and a further object being to minimize the cost of production of such instruments, (the whole cost of material and labor being perhaps no greater than the cost of an indicator or "runner" upon similar instruments now upon the market.)

These objects I attain in the manner hereinafter set forth, reference being had to the accompanying drawings, in which—

Figure 1:
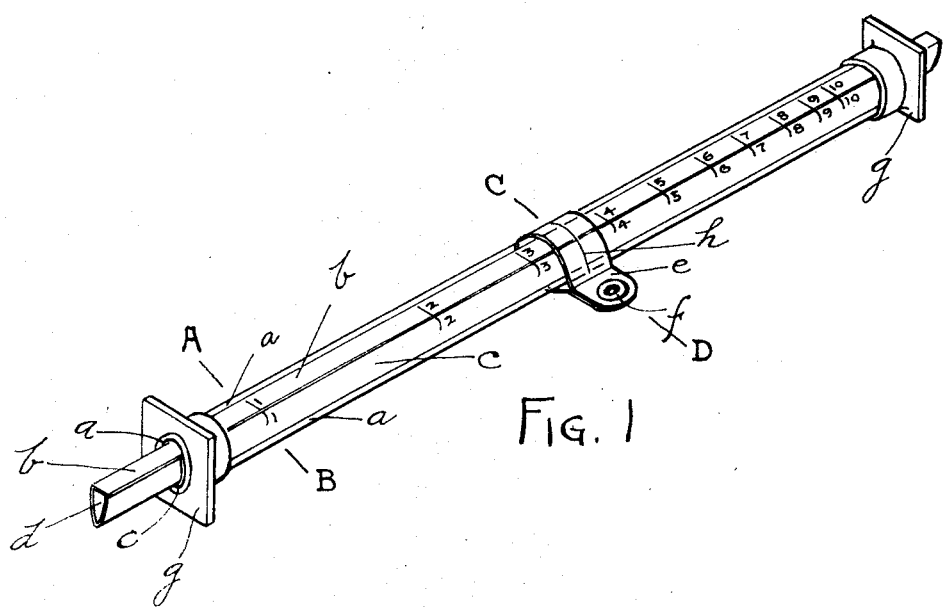
Figure 2:
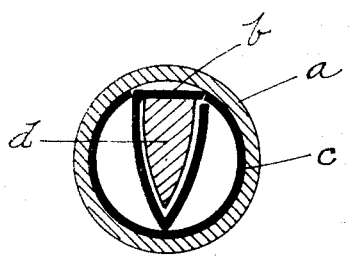
Figure 3:
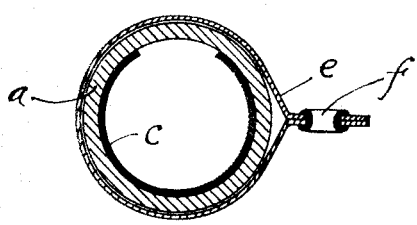

Figure 1 is a perspective view of the whole instrument. Fig. 2 is a cross-section on line A B, showing the scales within the tube. Fig. 3 is a cross-section on line C D, showing the indicator upon the tube.

Similar letters refer to similar parts throughout the several views.

The transparent tube $a$, preferably made of glass, envelops the fixed scale $c$, made, preferably, of white opaque material, such as bristol-board or celluloid, with the scales printed or engraved thereon, said scale $c$ being securely attached to the interior of tube $a$ by glue or other suitable means. The sliding scale $b$ is made, preferably, of white opaque material, such as bristol-board or celluloid, and folded in some such manner as shown to insure its sliding freely through tube $a$ between the edges of fixed scale $c$, sliding scale $b$ having its scale printed or engraved thereon. The sliding scale $b$ being engraved upon the chord of the missing arc of fixed scale $c$ avoids rubbing and consequent disfigurement of the graduations of said sliding scale which would result from continued sliding contact were it an arc coincident with the inside of tube $a$.

The tube $a$ is provided at either end with flange $g$ projecting at right angles to its axis, said flanges being made, preferably, of soft rubber of square or triangular form to prevent rolling of tube $a$ to keep scale side of tube uppermost and to break the shock of a drop upon a hard surface, such as a table or the floor.

The sliding scale $b$ may be provided with an internal strip of wood or other suitable material to strengthen said sliding scale, said strip $d$ being attached to scale $b$ by glue or other equally effective way, as by clamping it in a folded strip of metal.

The triangular form of sliding scale $b$, as shown in Fig. 2, is designed to secure the desired frictional fit within the tube $a$ and to insure close contact of the graduated scale edges, which is so essential.

The indicator $e$ is to be made of transparent material, such as celluloid, having a line $h$ etched upon its surface, as shown, and fashioned preferably, as shown in Fig. 3, with clamping tension upon tube $a$, given by the riveting together of the ends of the indicator $e$ by the eyelet $f$, thus securing the indicator at any point upon tube $a$ without liability of accidental shifting. This form of indicator has proven a highly satisfactory arrangement during more than a year's daily use, comparing very favorably with far more costly arrangements. It operates as follows: The indicator clamps the tube for about two hundred and seventy degrees, having a portion concentric with the exterior of said tube, from which extends tangential portions, which are offset radial to said tube to receive an eyelet-rivet, which joins the ends together. By grasping the eyelet between thumb and second finger and placing first finger back of the loop the riveted portion can be pressed toward the tube, causing the tangential portions to act as toggles, which force open the portion of indicator which grips the tube. The indicator can then be easily moved. Upon releasing the grasp of the fingers the indicator will be secure in any position. The indicator may be made in the form of a split cylinder having the desired frictional fit upon tube $a$.

Having described the nature of my slide-rule improvements, which I claim as my invention, I desire to secure by Letters Patent—

1. In a slide-rule, a straight transparent cylindrical tube, an interrupted cylindrical tube, with scales thereon, fixed within said transparent tube and a straight slide therein having a side, with scales thereon, equivalent in width to the chord of the missing arc of the said fixed scale-tube.

2. In a slide-rule a straight transparent cylindrical tube, fixed and sliding scales therein and an index sliding thereon, formed of transparent celluloid, secured around said tube by means of a rivet through extensions from tangential portions of said index.

3. In a slide-rule, a straight transparent cylindrical tube, fixed and sliding scales within said tube, elastic rubber guards on each end of said tube, to protect it from shock.

BENJAMIN DENVER COPPAGE.

Witnesses:
  H. B. BRADFORD,
  REGINALD CONSTABLE.